United States Patent Office 3,180,428
Patented Apr. 27, 1965

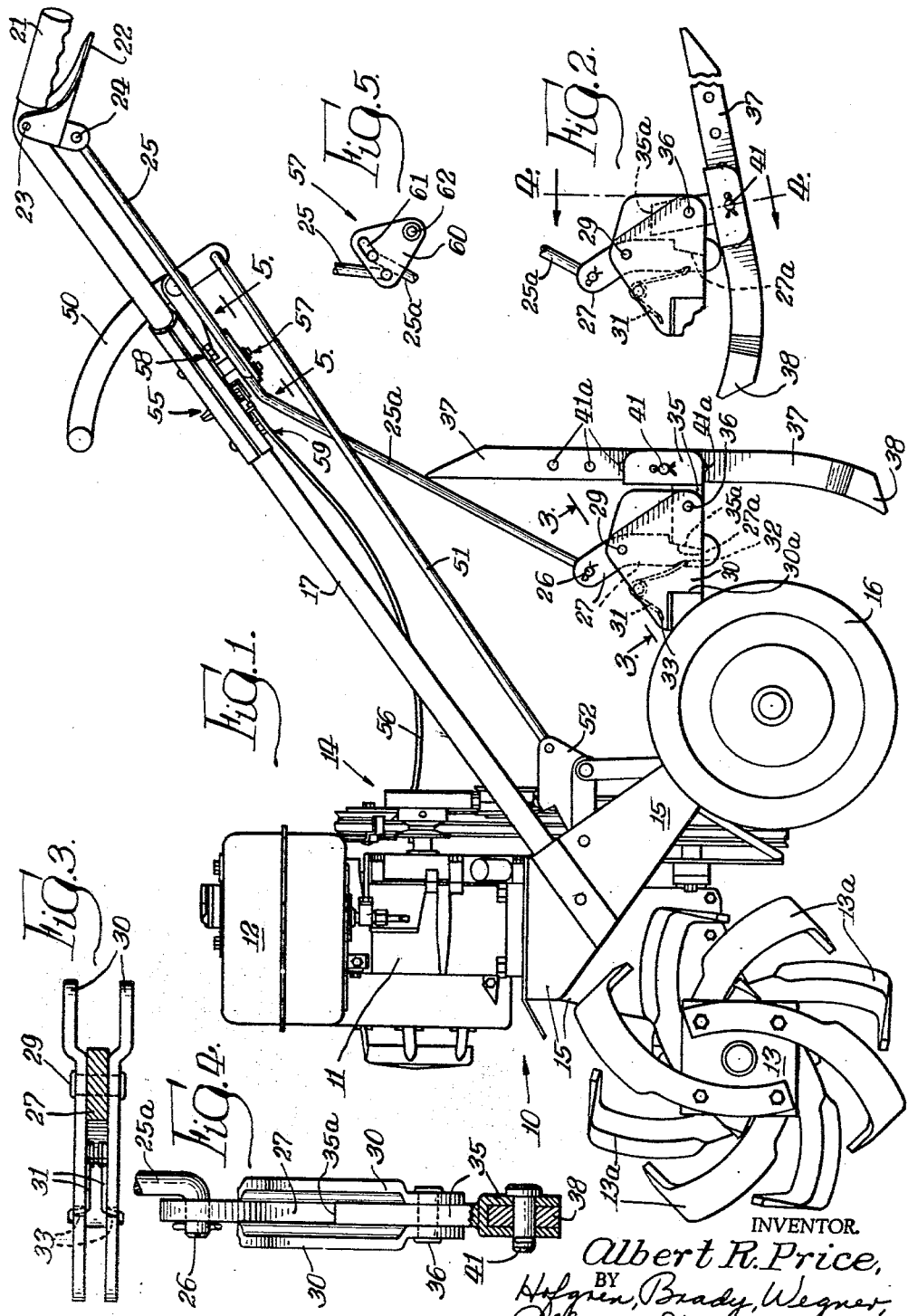

3,180,428
DEVICE FOR TILLING
Albert R. Price, Sullivan, Ill., assignor to Community
Industries, Ltd., a corporation of Illinois
Filed June 11, 1962, Ser. No. 201,541
11 Claims. (Cl. 172—42)

This invention relates to tilling devices for tilling soil with a power driven rotor and further relates to garden type tilling devices enabled for digging and/or filling operations in addition to the normal tilling or plowing operations. This invention more particularly relates to drag bar systems includable in a tilling device.

With the advent of a variety of power units of increased compactness, e.g. the development of internal combustion engines having lower size to power ratios, a variety of small power driven implements have been developed for use by the individual for gardening and other purposes. Power driven lawn sweepers, hedge clippers, lawn edgers, lawn mowers, and the like have been receiving acceptance by the consumer. Additionally, garden tilling devices have been developed and have, in recent years, received more and more acceptance by gardeners, whether hobbyists or professionals, to absorb much of the physical exertion normally associable with gardening and to often markedly decrease the number of work hours for a given job.

There have been provided a large variety of tilling devices. For example, a device capable of soil tilling operations is described by Igor Kamlukin in U.S. Patent 2,903,077, issued September 8, 1959. Basically, this device requires a power driven rotor to propel the device over and through the soil during tilling operations, and a drag bar assembly which is not capable of securing the device against rearward movement. The device also includes a frame mounted on wheels and having a gasoline engine, a power transmission between the engine and rotor which is capable of reversing the direction of the rotor to back the device up, a steering bar or handle attached to the frame, and a gasoline feed control and a transmission shifting control accessible from the steering handle. Such a device tills as it is propelled in either direction, e.g. as described by Kamlukin. However, such devices are often not adapted for digging and especially filling operations.

It is an object of this invention to provide drag bar adaptation for use in a tilling device to enable the tilling device to perform filling and like operations.

Another object of this invention is to provide a drag bar assembly which is controllable between effective and ineffective positions of the drag bar without regard to direction toward which the tilling device is urged by its propelling rotor.

Still another object of this invention is to provide a drag bar assembly which includes a drag bar which is pivotally mounted to a frame member which may be secured to the frame of the tilling device, and a drag bar control means extending from a position accessible to the operator to the drag bar wherein the drag bar control means is capable of causing releasable engagement for releasably holding the drag bar in its upright effective position.

It is another object of this invention to provide a drag bar which is pivotally mountable to a tilling device and is pivotable forward at the drag end, and means which are adapted to secure the drag bar in its upright position and in engagement with the ground during rearward rotation of the propelling rotor so that the drag bar assembly is useful in adapting a tilling device for performing filling operations and the like without substantial rearward movement of the tilling device.

A more specific object is to provide such a drag bar assembly which includes the drag bar, a projection from the front edge of the drag bar which is pivotally secured to a frame member for pivoting the drag bar to and from its effective position, a lever mounted to the frame member at its fulcrum and capable of pivoting to engage the projection of the drag bar with the drag bar in its upright or effective position, a spring urging the lever into engagement with the projection of the drag bar, and first and second control bars interconnected by a link works which is mounted on the tilling device, wherein the interconnected control bars extend from the lever to a gripper or handle control accessible to the operator to effect release of the lever from engagement with the drag bar projection to permit the drag bar to rotate to its ineffective position, and wherein the link works permits upward riding of the control bar which extends upwardly from the lever to the link works so that the drag bar can be manually reset in its upright effective position by reengagement with the spring urged lever without undue interference from the remainder of the drag bar assembly.

An additional object of this invention is to provide a tilling device having the adaptation of a drag bar assembly in accordance with any of the foregoing objects.

Other objects of this invention will be apparent to those in the art from the following descriptions and the drawings in which:

FIG. 1 is a side view of an embodiment of this invention including a garden tilling device equipped with a drag bar assembly and showing the drag bar in its upright or effective position;

FIG. 2 illustrates the drag bar of the embodiment of FIG. 1 in its ineffective position;

FIG. 3 is a cross-sectional view along lines 3—3 of FIG. 1;

FIG. 4 is a cross-sectional view along lines 4—4 of FIG. 2;

FIG. 5 is a view from along lines 5—5 of FIG. 1 showing link works in the control rod of the drag bar assembly.

The present invention provides a rotary tilling device with a drag bar system which can be maintained in its effective position regardless of the direction in which the device is being urged during operation.

In one form of this invention, such a drag bar assembly may be used in combination with a tilling device which includes a frame with a gasoline engine driven rotor mounted thereon and a transmission or reversible drive belt assembly between the engine and rotor for reversing direction of rotation of the rotor. A drag bar is pivotally mounted on the frame for movement toward and away from upright or effective position. A steering member is provided for manually steering the tilling device and a drag bar control is mounted in an accessible position on the steering member. An engaging lever operable by the drag bar control is movable between engaging and disengaging positions for selective engagement and disengagement of the drag bar. Accordingly, the drag bar may be latched in effective or upright position or may be unlatched and permitted to move from effective position. The engaging lever is normally urged into engagement with the drag bar by a spring mounted between the frame member and the engaging lever. Upon disengagement of the engaging lever from the drag bar by operation of the accessible drag bar control lever, the drag bar is permitted to pivot on the frame member to the ineffective drag bar position. The drag bar may be manually reset or returned to its effective position.

Referring now to FIGS. 1 through 5 of the drawings, there is shown a tilling device indicated generally at 10, which tilling device is of a size useful for gardening purposes. The tilling device includes an internal combustion engine of the gasoline type indicated at 11 and a gas tank 12 which are mounted on a frame 15. Rotor 13, provided with tines 13a, is also mounted to frame 15. Rotor 13 rotates in either a clockwise or counterclockwise direction with reference to FIG. 1 so that it can till and propel the tilling device in either a rearward or forward direction respectively. Drive belt assembly 14 is provided linking the output of internal combustion engine 11 with rotor 13 for driving the rotor. The drive belt assembly is a conventional assembly which is capable of reversing the rotor by suitable conventional control means which will be identified more particularly hereinbelow. Frame 15 is supported from the ground by a pair of wheels, one of which is shown as wheel 16.

The steering or handle means includes a rigid tubular member 17 which connects with frame 15 and a gun 21. A gripper type control lever 22 is pivotally mounted on tubular member 17 in gripping association with grip 21. Control lever 22 is pivotal on pin 23 and has control rod or bar 25 pivotally connected thereto at 24. Control rod 25 extends subjacent tubular member 17 to a link works shown at 57. As shown with reference to FIG. 5, link works 57 includes plate 60 pivotally mounted to tubular member 17 by pin 62 through a bracket means. Elongated slot 61 is provided in plate 60 and control bar 25a is pivotally and slidably mounted in slot 61. Control bar 25 is pivotally mounted to plate 60 as shown in FIG. 5. The pivotal connections of both control bars 25 and 25a are on the same side of a plane containing the pivotal axis of the plate and at least one point in the pivotal axis of the mounting of control bar 25 to gripper lever 22 at 24.

Control bar 25a extends to lever member 27 where a right angle extension of control bar 25a is pivotally secured through lever 27, as shown at 26, by a cotter pin. Lever member 27 is pivotally mounted by pin 29 to frame member 30 which is attached to frame 15 at 30a. Lever member 27 includes a groove or notch 27a which, as shown in FIG. 1, engages an end or surface 35a of an L-shaped drag bar mounting 35.

Lever member 27 is urged toward end 35a by spring 31 compressed between notch 32 and spring mounting 33 in frame member 30.

Drag bar mounting 35 carries drag bar 37 and is pivotable on pin 36 which mounts drag bar mounting to frame member 30. Drag bar 37 has a drag end 38 which engages the ground when the drag bar is in operative or effective position as shown in FIG. 1. Drag bar 37 is vertically adjustable on mounting 35 by means of the plurality of holes 41a through which the drag bar 37 can be affixed to mounting 35 by means of pin assembly 41.

The forward or rearward urging motion of rotor 13 can be controlled independent of the position of drag bar 37 by means of lever 50, rod 51 and drive belt control assembly 52. The drive belt control assembly 52 actuates the drive belt assembly 14 to reverse the rotation of rotor 13 with respect to engine output from internal combustion engine 11. Additionally, engine speed is also separately controllable at control panel 55 through control line 56. The control of engine speed and control of direction of rotation of rotor 13 may be effected by many means well known to those in the art and it is not necessary to describe such means herein in particular detail. The pivot of shift control lever 50 and the engine speed control line 56 are supported by tubular member 17 at 58 and 59 respectively.

In operation, gripping and urging together of elements 21 and 22 causes upward movement of control rod 25 which pivots plate 60 and pulls control rod 25a in an upward direction resulting in pivoting of lever member 27 about its fulcrum 29 thereby disengaging notch 27a from drag bar mounting 35 at end 35a. Drag bar 37 is thereby rendered free to pivot about pin 36 to an ineffective or inoperable position as shown in FIG. 2. Members 21 and 22 may then be released. The ineffective position of drag bar 37 as shown in FIG. 2 is used when it is desired to move the tiller in either forward or rearward direction, depending upon the direction of rotation of rotor 13.

To reset drag bar 37 to its operative position, it is merely necessary to move drag bar 37, e.g. manually or by foot, to its upright position. During such movement, surface 35a urges lever member 27 against spring 31 until surface 35a slips into notch 27a, whereupon spring 31 urges lever member 27 into proper engagement with drag bar mounting 37 as is shown in FIG. 1. During the urging of surface 35a against lever member 27, control bar 25a is urged in an upward position but does not have to force control lever 22 against handle 21 in order for end 35a to become reengaged in notch 27a. Slot 61 in plate 60 advantageously takes up the upward travel of control rod 25a. Such arrangement is particularly advantageous where it is desired to use spring means in mounting gripper lever 22 to normally urge gripper lever 22 away from grip 21 of the handle.

It is apparent from the foregoing that the operation of drag bar 37 to and from its effective position is independent of the rotation of rotor 13. Thus, forward tilling operations can be conducted with drag bar 37 in the effective position and rotor 13 rotating in a forward urging direction whereby the device tills as it moves forward. Although the illustrated device is not adapted for tilling in a rearward direction, other uses are possible. For example, rotor 13 can be rotated in a normally reverse urging direction while drag bar 37 is maintained in its effective position as shown in FIG. 1. In such operation of the tilling device, the device can be used to dig or fill holes. Accordingly, in a filling operation, the rotor 13 is positioned on a pile of dirt to be moved into a hole in front of the tilling device. Drag bar 37 is maintained in its upright or effective position as shown in FIG. 1 while rotor 13 is operated in a normally reverse propelling direction, i.e. clockwise as shown in the side view of FIG. 1. The rotor 13 is restrained from rearward travel by drag bar 37 and operates to throw the dirt from the pile forward into the hole. Additionally, digging operations may be conducted with the reverse rotating rotor and the drag bar in effective position, as is evident. Such filling and digging operations are conducted without substantial backward movement of the tilling device.

The foregoing detailed description has been given for clearness of understanding only and no unnecessary limitation should be understood therefrom. Some modification should be obvious to those skilled in the art.

I claim:

1. A tilling device comprising a frame having mounted thereon a gasoline engine driven reversible rotor, wheel means supporting said frame, an upwardly inclined handle means secured to said frame having a grip adjacent the upper end of said elongated member, means for reversing the rotation of said rotor mounted on said elongated member, gripper means mounted on said handle adjacent said grip, first control bar means mounted at one end to and longitudinally urgeable by said gripper means said first control bar means being connected at its other end to a link works means, a second control bar means connected at one end to said link works means, said second control bar means being pivotally connected at its other end to a lever adapted to engage a pivotal member mounted on said frame and secured to and carrying a drag bar to releasably secure the drag bar in upright effective position, and spring means urging said lever into releasable engagement with said pivotal member secured to the drag bar said link works means including lost motion means permitting upward riding of said second control bar means independent of said first control bar means.

2. In a tilling device comprising a frame having mounted thereon a gasoline engine driven rotor transmission means between an engine and rotor for reversing direction of rotor rotation, wheel means supporting said frame, an upwardly inclined elongated handle secured at its lower end to said frame and having a grip adjacent the upper end of said handle for holding and steering the tilling device, transmission control means mounted on said handle, in combination therewith a separate gripper control lever pivotally mounted on said handle at said grip, a first control bar pivotally mounted at one end to said control lever and extending at the other end to a link works means, said first bar being connected at said other end to said link works means, lost motion connecting means in said link works means, a second control bar having an upper end pivotably and slidably carried by said lost motion connecting means, said second control bar being pivotably connected at its lower end to a lever mounted at its fulcrum to a frame member of said tilling device, said lever being adapted to engage a projection pivotally mounted to said frame member to releasably hold a drag bar attached thereto in upright position, and a spring mounted between said frame member and said lever urging said lever into engagement with said projection.

3. A tilling device comprising a frame having mounted thereon a gasoline engine driven rotor, transmission means between an engine and rotor for reversing direction of rotor rotation, wheel means supporting said frame, an upwardly inclined handle secured at its lower end to said frame for holding and steering the tilling device, transmission control means mounted on said handle, a separate gripper control lever pivotally mounted on said handle, a first control bar pivotally mounted to said control lever and extending subjacent along said handle and pivotally connected to a link works means mounted on said handle, said link works means comprising a pivotable plate having an elongated slot with the pivotal connection of said first control bar on the same side thereof as said slot with respect to a plane defined by the pivotal axis of said plate and by a point in the pivotal axis at the mounting of said first control bar to said control lever, a second control bar pivotally and slidably carried at one end by said slot, said second control bar being pivotably connected at its other end to an engaging lever pivotally mounted at its fulcrum to a frame member of said tilling device, said engaging lever being adapted to engage a projection pivotally mounted to said frame member, said projection being a projection from the forward edge of a drag bar, said drag bar being secured in upright position by engagement of said projection by said engaging lever, and a spring mounted between said frame member and said engaging lever urging said engaging lever into engagement with said projection, whereby pivoting of said gripper control lever results in pulling said engaging lever against the urging of said spring to release said projection from engagement with said engaging lever permitting said projection and drag bar to pivot on said frame member to an ineffective drag bar position, said slot in said link works plate being of sufficient length to permit upward riding of said second control bar therein while said drag bar is being manually returned to its upright position.

4. A rotor-type tilling device comprising a frame having a tilling rotor mounted for rotation in forward and rearward directions, drive means including motor means on said frame for driving said rotor and including selectively operable means for reversing the direction of rotor drive, said rotor having cultivating means for engaging the ground and propelling said frame in the direction driven by said drive means, handle means secured to said frame for steering the device during propelling, ground engaging means having a digging element for resisting propulsion of said frame in either direction, means pivotally mounting said ground engaging means on said frame for movement between an effective position in digging engagement with the ground and an ineffective position away from digging engagement with the ground, means for releasably holding said ground engaging means in said effective position, and manually operable means mounted on said handle means remote from said holding means and extending to said holding means for selectively releasing said holding means.

5. The device of claim 4 including means biasing said holding means normally toward holding position in engagement with said ground engaging means.

6. The device of claim 5 wherein said holding means comprises latch means mounted on said frame for movement between a latched position engaging said ground engaging means and an unlatched position away from engagement with said ground engaging means.

7. The device of claim 4 including a grip on said handle means and wherein said manually operable means is mounted adjacent said grip.

8. The device of claim 4 wherein said manually operable means includes lost motion connecting means.

9. The device of claim 4 wherein said ground engaging means comprises an elongated bar member and said digging element comprises one end of said bar member, said bar member being vertically disposed in effective position and being balanced to swing under gravity to ineffective position in generally horizontal disposition upon release of said ground engaging means by said manually movable means.

10. The device of claim 4 wherein said ground engaging means includes means for adjusting the vertical disposition of said digging element in effective position.

11. In a rotor-type tilling device which can be driven in either forward or rearward direction by reversing the direction of rotation of the rotor and having a drag bar member pivotally mounted on a frame member and adapted to be pivoted forward at its drag end for disengagement with the ground, in combination therewith, means comprising a lever pivotally mounted on said frame member for engaging and selectively releasing said drag bar to an ineffective position or securing said drag bar member in an effective position, said drag bar while in ineffective position remaining with the drag end out of engagement with the ground during rotation of the rotor in either driving direction and said drag while in effective position having the drag end in position for engagement with the ground during rotation of the rotor in either driving direction, said lever being spring urged toward engagement with said drag bar member, a control rod means pivotally mounted at one end to said lever for urging said lever against said spring and out of engagement with said drag bar member whereby the drag end is free to pivot to ineffective position, said control rod means including lost motion means adapted to absorb the urging of said spring with said lever in a position of disengagement from said drag bar member, and a control handle at the other end of said control rod means.

References Cited by the Examiner
UNITED STATES PATENTS

| | | | |
|---|---|---|---|
| 2,520,488 | 8/50 | Batchelder | 172—42 X |
| 2,544,682 | 3/51 | Hilgeman | 292—210 X |
| 2,552,292 | 5/51 | Metz et al. | 172—683 |
| 2,692,445 | 10/54 | Darnell | 172—42 X |
| 2,803,183 | 8/57 | Smithburn | 172—43 |
| 2,903,077 | 9/59 | Kamlukin | 172—42 |
| 2,975,839 | 3/61 | Burrows et al. | 172—42 X |
| 2,989,127 | 6/61 | Oertle | 172—42 |
| 3,040,590 | 6/62 | Smithburn | 172—42 X |

ABRAHAM G. STONE, *Primary Examiner.*
A. JOSEPH GOLDBERG, *Examiner.*